United States Patent [19]

Karube et al.

[11] 4,258,246
[45] Mar. 24, 1981

[54] ROTOR BALANCING DEVICE UTILIZING A LASER BEAM

[75] Inventors: Norio Karube; Yasuyuki Morita, both of Machida; Eizo Yamaka, Yokohama; Takasi Kuno, Kunitachi, all of Japan

[73] Assignee: Matsushita Electric Industrial Co., Ltd., Kadom, Japan

[21] Appl. No.: 912,711

[22] Filed: Jun. 5, 1978

Related U.S. Application Data

[63] Continuation of Ser. No. 762,350, Jan. 25, 1977, abandoned.

[30] Foreign Application Priority Data

Oct. 19, 1976 [JP] Japan .................................. 51/125759

[51] Int. Cl.³ .............................................. B23K 27/00
[52] U.S. Cl. ...................... 219/121 LW; 219/121 FS; 219/121 EB; 219/121 LG; 350/6.6; 350/486; 346/76 L
[58] Field of Search ..... 219/121 LM, 121 L, 121 EB; 350/6, 7, 285; 346/76 L

[56] References Cited

U.S. PATENT DOCUMENTS

| 3,398,237 | 8/1968 | Paidosh | 219/121 L |
| 3,594,261 | 7/1971 | Broerman | 219/121 LM |
| 3,663,795 | 5/1972 | Myer | 219/121 L |
| 3,750,049 | 7/1973 | Dowley et al. | 219/121 LM |
| 3,755,646 | 8/1973 | Muller | 219/121 LM |
| 3,909,584 | 9/1975 | Brienza et al. | 219/121 L |
| 3,953,706 | 4/1976 | Harris et al. | 219/121 L |
| 4,028,524 | 6/1977 | Moll et al. | 217/121 L |
| 4,059,876 | 11/1977 | Ditto | 219/121 L |

*Primary Examiner*—B. A. Reynolds
*Assistant Examiner*—M. H. Paschall
*Attorney, Agent, or Firm*—Stevens, Davis, Miller & Mosher

[57] ABSTRACT

Disclosed is a device for automatically correcting dynamic-unbalance of a rotor. The device utilizes a laser beam which moves in synchronism with movement of a detected unbalanced position on the rotor to burn off portions of the rotor until a balanced condition is achieved.

4 Claims, 42 Drawing Figures

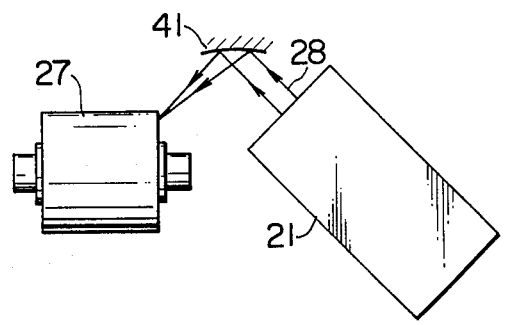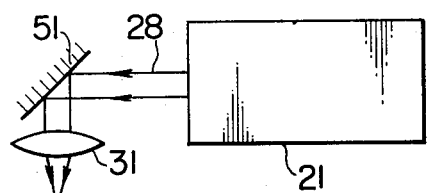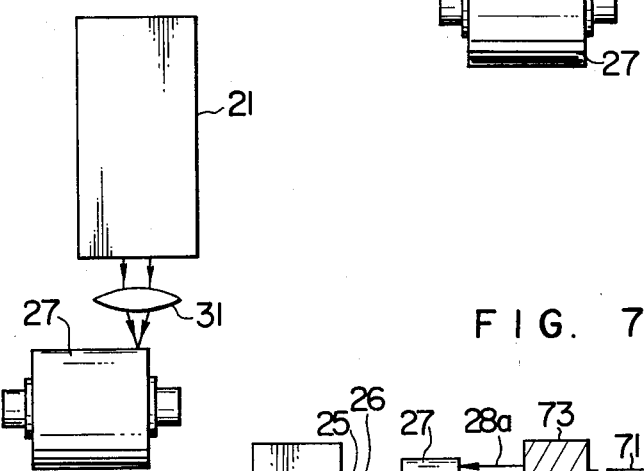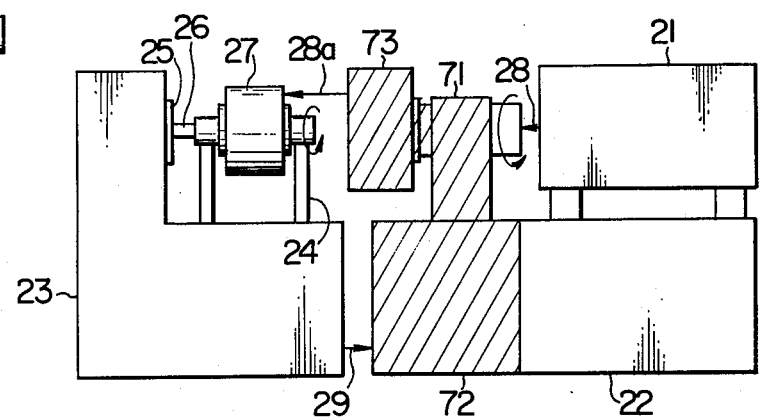

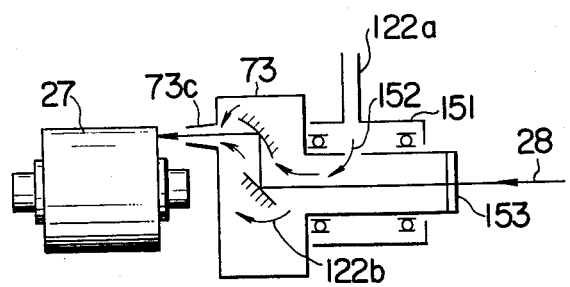
FIG. 17
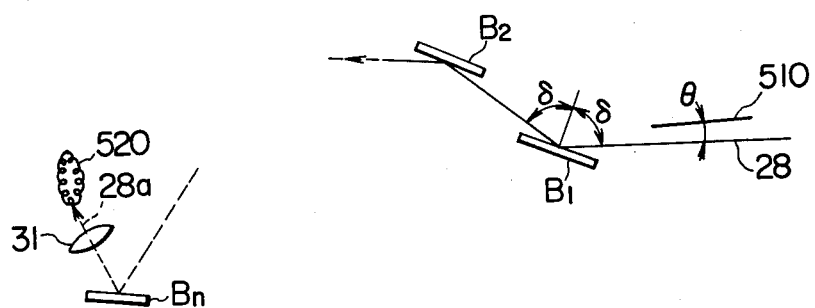
FIG. 18
FIG. 19a
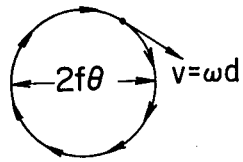
FIG. 19b
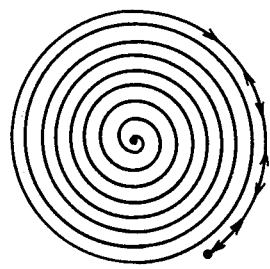
FIG. 19c
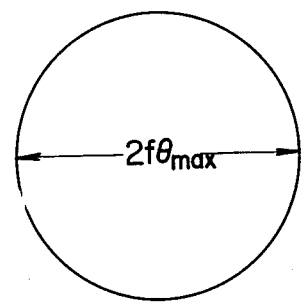

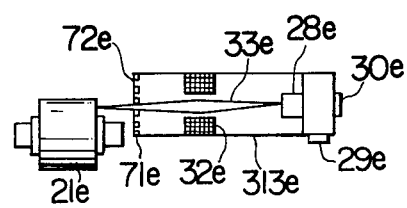
F I G. 37
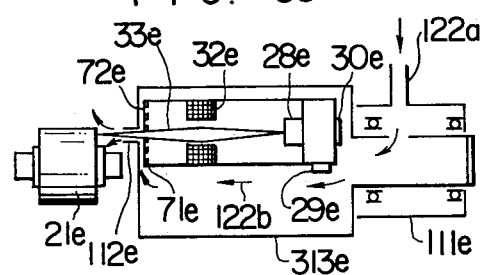
F I G. 38

ROTOR BALANCING DEVICE UTILIZING A LASER BEAM

This is a continuation of application Ser. No. 762,350 filed Jan. 25, 1977, abandoned.

BACKGROUND OF THE INVENTION

The present invention relates to a device for automatically detecting the dynamic out-of-balance condition of a rotor or the like and correcting it.

In the rotary machine, a rotor must be correctly dynamically balanced in order to prevent vibration, noise and degradation of performance and durability. However, it has been extremely difficult to attain the realization of this process, e.g. the automatic (to be referred to as "out-of-balance" in this specification for brevity) detection and correction of the dynamic out-of-balance condition.

So far only the step for detecting the out-of-balance condition of a rotor or the like has been automated, and correction has been manually carried out so that the balancing efficiency is low, the rotor cannot be balanced with a high degree of accuracy, and skilled workers are required.

Recently rotor balancing devices utilizing non-contacting machining techniques such as laser beam have been devised and demonstrated, but their performance has not been satisfactory in practice because of the below described problems. In general, as compared with the latent heat of heating and melting, the latent heat of evaporation of metal is considerably higher, and the evaporation and removal of excess metal is used in balancing a rotor so that the prior art devices for utilizing only the thermal energy liberated by the laser beam for evaporating metal have low efficiency and are not economical. The present day laser technique provides pulsed laser beam which has a thermal energy of only a few joules per pulse when pulsated at a high repetition rate so that only a few micrograms of metal may be evaporated and removed per pulse. However, in order to balance a rotor of even a small-sized motor about one gram of metal must be evaporated and removed.

Therefore with the prior art balancing devices of the type utilizing the noncontacting machining techniques such as using laser beam, very minute parts such as those of wrist watches and rotors such as those of gyroscopes which must be balanced with a higher degree of accuracy may be advantageously balanced, but rotors of motors of the general type cannot be balanced economically.

SUMMARY OF THE INVENTION

One of the objects of the present invention is therefore to provide an automatic rotor balancing device which overcomes the above noted and the other problems encountered in the prior art devices, utilizing a noncontacting machining technique, wherein a high power energy is used than that used in the prior art device.

Another object of the present invention is to improve the rate of operation of an energy beam generator used for balancing rotors or the like.

According to one aspect of the present invention, an oxidizer and metal are brought into contact with each other at high temperatures to thereby cause very rapid oxidation of metal, accelerating an exothermic reaction. Heat obtained in the above step further accelerates oxidation with the resultant high thermal energy sufficient enough to overcome the high latent heat of evaporation of metal and evaporate and remove a desired amount of excess metal at sufficiently high speed. Therefore the present invention permits the balancing of a rotor at a high speed hitherto unattainable by the prior art devices so that rotor balancing devices may be automated and incorporated in a mass production line.

According to another aspect of the present invention, in order to improve the rate of operation of the laser beam generated by a laser whose capital and operation costs are very expensive, a plurality of out-of-balance detecting devices are arranged in such a way that the laser beam from one laser may be sequentially directed in a time sharing manner to rotors on the detecting devices for balancing them so that the productivity may be considerably improved and the cost of the rotors may be reduced.

The present invention will become more apparent from the following description of the preferred embodiments thereof taken in conjunction with the accompanying drawings.

BRIEF DESCRIPTION OF THE DRAWINGS

FIGS. 3, 4, 5 and 6 are schematic views used for the explanation of arrangements used in conjunction with the first embodiment shown in FIG. 2 for focusing the laser beam on a rotor;

FIG. 7 is a schematic side view of the second embodiment of the present invention;

FIG. 17 is a view used for showing oxidizing gas used with a continuous laser;

FIG. 18 is a view used for the explanation of an energy beam scanning device used in the second embodiment;

FIGS. 19a, 19b and 19c are views illustrating scanning lines of the focused energy beam spot scanned by the scanning device shown in FIG. 18;

FIGS. 31 to 38 are views showing various embodiments of the present invention.

DESCRIPTION OF THE PREFERRED EMBODIMENTS

Figure 1:
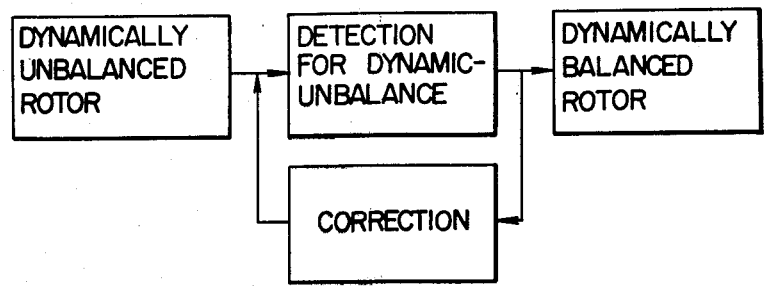
FIG. 1 is a block diagram used for the explanation of the underlying principle of the present invention.

In FIG. 1 there is shown a block diagram of the fundamental operation carried out by a device in accordance with the present invention for correcting the dynamic-out-of-balance of a rotor. A rotor is tested for balance condition, whereby the magnitude of the out-of-balance condition in the rotor and its phase information is determined, following which a correction of the unbalanced condition is then carried out. These steps are repeated in a negative feed-back loop until the eccentricity of the center of gravity of the rotor is brought into a desired range of tolerance, and then the balanced rotor is transferred to the next station.

Figure 2:
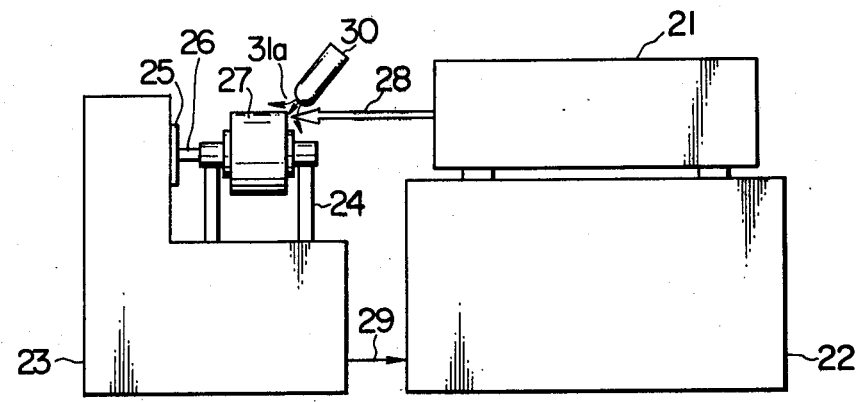
FIG. 2 is a schematic view of the first embodiment of the present invention.

In FIG. 2 there is shown the first embodiment of the present invention of the type utilizing the laser beam as the energy beam for correcting rotors which are out-of-balance. It comprises a laser oscillator 21, a laser driving system 22, a detector 23 for detecting the magnitude and phase of an out-of-balance condition of a rotor being spun, the detector 23 including a drive system for spinning a rotor, a rotor support 24 including elements for detecting the magnitude and phase of the out-of-balance condition of the rotor being spun, the rotation of a drive shaft 25 of the detector 23 being transmitted through a flexible coupler 26 to a rotor 27 for spinning it and an oxygen injection nozzle 30. In response to a control signal 29 from the detector, a laser beam 28 is emitted and focused on to the rotor 27 being spun while the oxygen is blown against the rotor 27 as indicated by arrows so that a heavy spot is removed by vaporization as indicated by the arrow.

More specifically, the detector element detects the eccentricity of the center of gravity of the rotor 27 being spun and generates the signal representative of this eccentricity. In response to this signal the detector 23 generates the control signal 29 in response to which the laser drive system 22 causes the laser oscillator 21 to emit the laser beam 28. The response to the control signal 29, the intensity, duration, repetitive frequency, timing and so on of the laser beam 28 are controlled so that a heavy portion in the rotor 27 may be removed in an accurate amount in response to the detected eccentricity.

According to the present invention, various thermal energy sources may be employed in order to remove heavy portions of the rotor. First of all, a pulsed laser beam will be described.

Pulsed Laser Beam

The pulsed laser beam must have a predetermined pulse duration and energy. The pulse duration is dependent upon the rotational speed of the rotor and its upper-limit is about 500 micro seconds when the rotational speed is about 2,000 rpm. A lower limit of the pulse duration is determined by not only the speed of the oxidation or evaporation but also by the formation of plasma on the surface of the rotor, and is about one micro second. As to the pulse energy, the results of experiments conducted by the inventor show that it is of the order of 10 joules. Therefore it is preferable to use a carbon dioxide laser in which discharge excitation is performed in the tube-axial direction and which may be feasible at the present level of the laser technology for generating the laser pulses having pulse repetition rate, the pulse duration and pulse energy specified above.

When the rotor 27 is of a small-sized motor, it is spun at 2,000 rpm, and the eccentricity detected by the detecting element is transmitted to the detector 23 so that a sinusoidal electrical signal as shown in FIG. 13a is derived and applied as the control signal 29 to the laser drive system 22. The frequency of the electrical signal corresponds to the spinning speed of the rotor 27; the phase, to the location of a heavy portion on the rotor; and the amplitude, to the eccentricity.

In response to the control signal 29, the laser 21 emits the laser beam 20 having a predetermined repetition rate phase, intensity and duration depending upon the spinning speed of the rotor 27. Together with the oxygen gas jet, the pulsed laser beam 28 is focused at the heavy portion in the rotor 27. The heavy portion at which the pulsed laser beam 28 is focused affects the phase of the beam; that is, the laser firing timing. The oxygen gas jet may be so controlled as to be instantaneously concentrated on the heavy portion. Then, at the heavy portion under the bombardment of the pulsed laser beam 28 and the oxygen jet, an explosion-like local oxidation occurs so that metal at the heavy portion is evaporated. The result is immediately reflected on the unbalance to be detected so that an amount of metal to be evaporated in the next bombardment will be determined. The amount of metal to be evaporated is controlled by the number of pulses and intensity of the pulsed laser beam 28 or by the control of the flow rate of the oxygen jet.

Next a method for focusing the pulsed laser beam 28 on the spinning rotor 27 will be described. Choice of optical elements and arrangment thereof vary depending upon the position of pulsed laser beam emission, and a portion of the rotor at which the laser beam 28 is focused.

Figure 3:
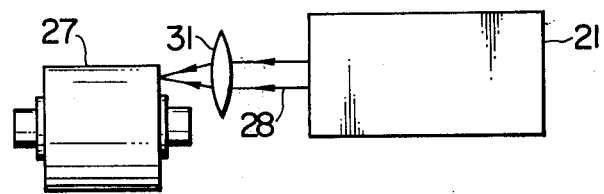

FIG. 3 shows an arrangement for focusing the pulsed laser beam on one end face of a metal part such as a cylindrical rotor of a motor. In this arrangement, the pulsed laser beam 28 emitted from the laser oscillator 21 is focused by a lens 31 so as to be focused on the end face of the rotor 27 with an extremely high energy density while the jet of oxygen gas or suitable oxidizer is brought into contact with the rotor 27. Then, an explosition-like local oxidation occurs resulting in a local evaporation of the metal of the rotor. The method for introducing the oxidizer will be described later.

An arrangement shown in FIG. 4 is also for the bombardment of the pulsed laser beam 28 on the end face of the rotor 27. In this arrangement, instead of the condenser 31, a parabolic reflector 41 is used. Alternatively, the pulsed laser beam 28 may be reflected by a flat reflector and then made to pass through a condenser lens.

In an arrangement shown in FIG. 5, the pulsed laser beam 28 is redirected by a flat mirror or reflector 51 and then is condensed by a condenser 31 so as to be focused upon the side surface of the rotor 27. Alternatively, The pulsed laser beam 28 may be redirected and focused by a parabolic reflector.

In an arrangement shown in FIG. 6, the pulsed laser beam 28 is focused by the condenser lens 31 to be impinged on the side surface of the rotor 27.

Continuous Laser Beam

While the pulsed laser beam is advantageously used to remove a relatively small amount of metal per pulse, the continuous laser beam is advantageous in that a relatively large amount of metal may be evaporated from a rotor which is greater in size than the rotors of the small-sized motors. Oxidation of metal is a sort of positive feedback phenomenon so that it is more advantageous to keep it continued. Therefore, with a relatively low laser beam power, metal may be evaporated in a large amount. The underlying principle of a device for utilizing the continuous laser beam for correction of an out-of balance condition is essentially similar to that of the first embodiment described above except that instead of intermittent evaporations of metal, evaporation is continuously carried out while the out-of-balance condition is being detected.

It should be noted that instead of the continuous laser beam, a pulse laser beam with a sufficiently long pulse duration may be employed.

The results of experiments conducted by the inventor showed that it is preferable to use a laser beam with the continuous or average output power of hundreds of watts. With the pulsed laser beam, the position of bombardment is fixed in space, on the contrary, with the continuous laser beam, control means must be provided so that the continuous laser beam may be focused only at a predetermined spot in the rotor 27 being spun as will be described in detail hereinafter.

Referring to FIG. 7, the continuous laser beam 28 is precisely focused onto the predetermined, fixed spot in the rotor 27 by a laser beam guide control system comprising a beam guide drive device 71, a beam guide control unit 72 and a beam guide 73. These parts are hatched in FIG. 7. The beam guide 73 is so devised and constructed that the laser beam 28 transfered along the rotating axis thereof may be redirected to be focused onto the desired heavy portion on the end surface of the rotor 27. The beam guide 73 is rotatably supported by bearings (not shown) in the drive device 71 and is rotated by it in synchronism with the rotor 27 in response to the control signal 29 from the detector 23 in such a way that the continuous laser beam 28 may be focused onto the heavy portion in the rotor 27 as will be described in more detail hereinafter.

Figure 8:
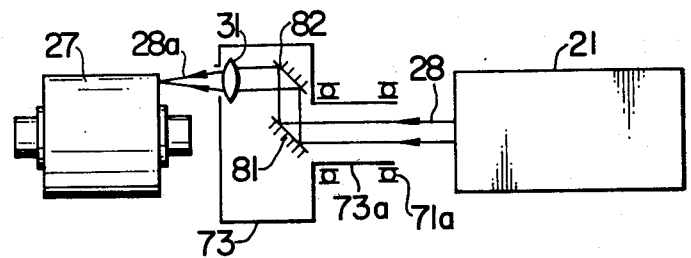
FIGS. 8, 9 and 10 are views used for the explanation of arrangements used in conjunction with the second embodiment shown in FIG. 7 for focusing the laser or energy beam on the rotor to be balanced.

Next referring to FIGS. 8 and 9, an optical system of the beam guide 73 will be described in detail. In the arrangement shown in FIG. 8, the continuous laser beam is focused at the heavy portion on the end face or the rotor 27. The continuous laser beam 28 emitted from the laser 21 is redirected by flat mirrors or reflectors 81 and 82 and focused by the condenser lens 31 to impinge on the rotor 27. The beam guide 73 has a hollow cylinder or shaft 73a which is supported by bearings 71a for rotation in synchronism with the rotor 27.

As described previously in conjunction with the pulsed laser beam, instead of the flat reflector 82 and the condenser lens, a parabolic reflector may be placed in the position of the flat reflector 82.

Figure 9:
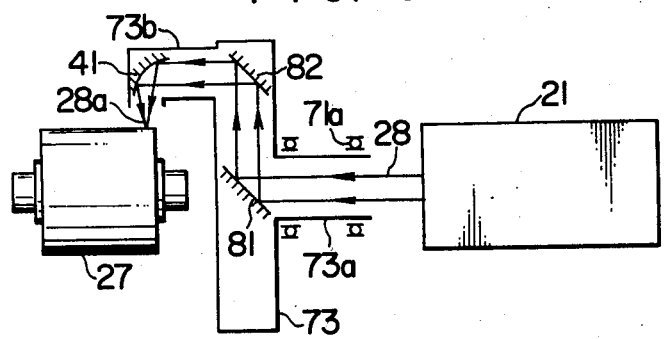

With the arrangement shown in FIG. 9, the continuous laser beam is focused at the heavy portion on the peripheral surface of the rotor 27. The construction is substantially similar to that shown in FIG. 8 except that a hollow cylinder 73b is formed integral with the beam guide and is extended in parallel with the axis of the beam guide 73 and the parabolic mirror 41 is mounted in the extension 73b in such a way that the continuous laser beam 28a may be focused at the heavy portion on the peripheral surface of the rotor 27. Instead of the parabolic reflector 41, a combination of a flat reflector and a condenser lens may be employed as described previously.

In the above description a refractive optical system of a lens optical system is used. However, reflective optical system or a condenser mirror optical system may also be used.

In case a higher energy beam is applied to the lens system, the lens system must inevitably be cooled. On the contrary, by using the mirror system, the problem of employing a cooling system is eliminated. Further, when the mirror system is used, the whole construction of the device according to the present embodiment becomes simpler, thereby facilitating the smooth and stable operation of the rotating mechanism of the device.

Figure 10:
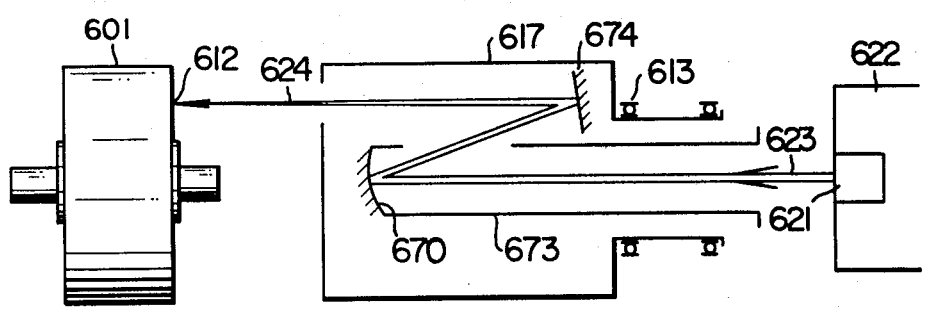

An embodiment having the mirror system is illustrated in FIG. 10. In the figure, reference numeral 601 denotes a rotor to be balanced; 613, a bearing; 617, a beam guide; 621, a laser oscillator; 622, a laser driving system; 612, a beam focus; 623 and 624, an inlet and an outlet beams of the beams guide 621, respectively; 670, a condenser mirror consisting of a concave parabolic or spherical mirror; 673, a mirror holder; 674, a plane mirror. The laser beam 623 generated by the laser oscillator 621 is converged, by the condenser mirror 670, into a focus on the surface of the rotor 601 through the plane mirror 674 arranged on the optical path of the laser beam 624 within the beam guide 617. The beam rotation of this embodiment may be obtained by the similar way heretofore described.

As with the case of the first embodiment of the type utilizing the pulsed laser beam, the signal from the detecting element or detector must contain two kinds of informations. One is the information on the exact position of a heavy portion while the other, the information of the magnitude of the out-of-balance condition; that is, the eccentricity of the center of gravity of the rotor 27 from the axis of rotation thereof caused by the presence of the heavy portion. The out-of-balance correction has two degrees of freedom; that is, the selection of an evaporation spot on the rotor and an evaporation amount.

In the device of the type utilizing the pulsed laser beam, the selection of an evaporation position or spot may be controlled by the timing of the pulsed laser beam emission, whereas in the device of the type utilizing the continuous laser beam, the rotations of the laser beam; that is, the beam guide 73 and of the rotor 27 must be locked in phase as will be described below in detail.

Figure 11:
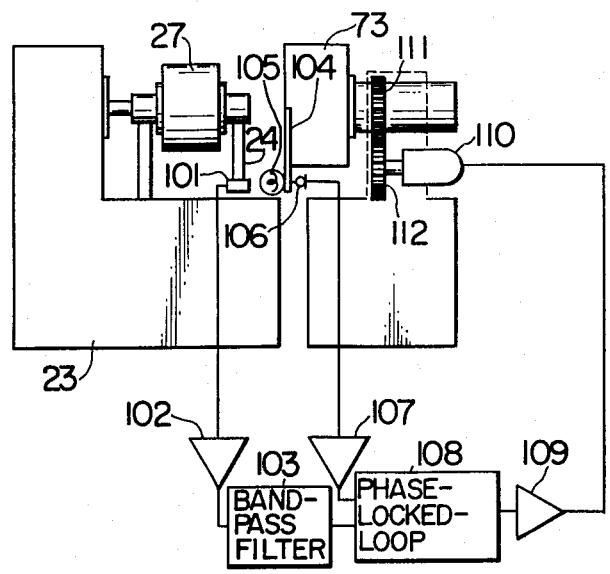
FIG. 11 is a view used for the explanation of a system used in the second embodiment shown in FIG. 7 for controlling the rotation of a beam guide in synchronism and predetermined phase relationship with the rotor to be balanced.

Referring to FIG. 11, a detecting element 101 such as a strain gauge is placed in the support 23 so that unbalanced force produced by the eccentricity of the center of gravity of the rotor 27 may be converted into corresponding electrical signal, which in turn is amplified by an amplifier 102, filtered by a band-pass filter 103 and applied to a phase locked loop 108. An output from the phase locked loop 108 is amplified by a power amplifier 109 and applied to a motor 110 which is coupled through gears 111 and 112 to the beam guide 73. Light from a light source 105 is made by a light shielding member 104 attached to the beam guide 73 to be intermittently incident at a photoelectric element or cell 104. An output from the photoelectric cell 104 is amplified by an amplifier 107 and is applied to a comparison input of the phase locked loop 108. The light shielding member 104 is so dimensioned that light from the light source 105 may be interrupted for a half cycle of rotation of the beam guide 73. The gear ratio between the gears 111 and 112 is 1:1.

Figure 12A:
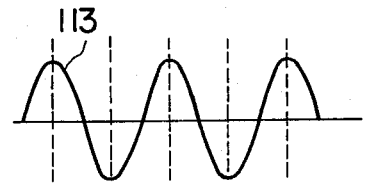
FIGS. 12a and 12b show waveforms of signals used for the control of the beam guide of the second embodiment.

The mode of operation of the continuous laser beam guide control system with the above construction will be described in detail with further reference to FIG. 12a and FIG. 12b. FIG. 12a shows the waveform of an electrical signal from the detecting element 101, and the frequency is equal to the rotation frequency of the rotor 27; the amplitude is in proportion to the magnitude of the out-of-balance condition; and the phase corresponds to the location of a heavy portion of the rotor. The frequency of the output from the phase locked loop 108 is dependent upon the difference in phase between the two inputs; that is, the output from the band-pass filter 103, representative of the out-of-balance signal 113, and the output from the amplifier 107, representative of the electrical signal 114 from the photoelectric cell 106. The phase locked loop 108 is adjusted such that when the signals 113 and 114 are out of phase by 90°, as shown in FIGS. 12a, b, the output frequency from the phase locked loop 108 equals a reference power-supply frequency. Therefore, when the motor 110 is driven with the reference frequency, the rotation of the beam guide 73 is accurately made into synchronism with the rotation of the rotor 27, so that the electrical signals 113 and 114 may be maintained in the phase relationship shown in FIG. 12 and any deviation from this relation may be automatically corrected.

When the rotor 27 and the beam guide 73 are out of synchronism, the input signals to the phase locked loop 108 are out of phase by more or less than 90° so that the output frequency from the phase locked loop 108 changes and consequently the input frequency to the motor 110 deviates from the reference frequency. Therefore the motor 110 automatically controls its rotation so that the beam guide 73 may rotate again in exact synchronism with the rotor 27. As a result, the two input signals to the phase locked loop 108 are again out of phase by 90°.

Figure 13:
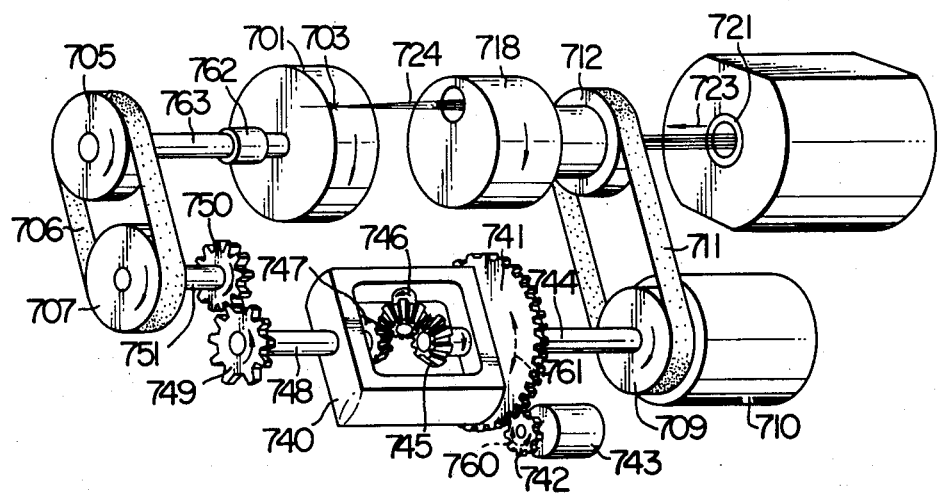
FIG. 13 is a perspective view showing a modificatin of FIG. 11.

In the illustration in FIG. 11, the phase control motor 110 is directly engaged to the rotating mechanism. However, the motor may be indirectly engaged with the rotating mechanism through a differential gear unit, as shown in FIG. 13. A laser beam 723 generated by a laser oscillator 721 is converted, by means of a beam guide 718, into a rotating beam 724 which is focused on the surface of a rotor 701 to be balanced. The beam guide 723 is rotated by a motor 710 through a belt 711 and pulleys 709 and 712. Further, the shaft of the motor 710 is directly connected to the shaft 744 of a first bevel gear 745, which is a component of a differential gear unit having a gear box housing 740. The first spur gear 741 is integrally mounted to the gear box housing 740. The shaft 744 is supported by a bearing which is so mounted that the shaft 744 is freely rotated relative to both the gear box housing 740 and the spur gear 741. The second bevel gear 746 is so mounted to the gear box housing 740 that it is freely rotated around a center shaft fixed to the gear box housing 740. The third bevel gear 747 is integrally arranged at its one end to a shaft 748, and is freely rotated relative to the gear box housing 740. The other end of the shaft 748 is fixedly mounted with the second spur gear 749 engaged with the third spur gear 750. Due to the above mentioned relationship, the rotating direction of a shaft 751, one end of which is connected to the third spur gear 750, is counter to that of the shaft 748. The other end of the shaft 748 is fixedly mounted with a pulley 707. Thus, the rotor 701 to be balanced is rotated by a driving power transmitted from the pulley 707 through a belt 706, a pulley 705, a shaft 763 and an universal joint 762. The phase control motor 710 rotates the gear box housing 743 through the two spur gears 742 and 741. When the phase control motor 743 rests, the rotor 701 and the laser beam 724 are rotated in the same constant velocity in the same direction. Since the phase control motor 743 is rotatable in both directions, the phase alignment between the rotor 710 and the rotating laser beam 724 is adjustable. The operation for the phase control system may be similar to that previously described.

Figure 12B:
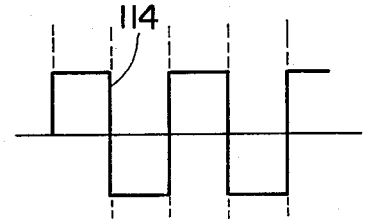

When the two electrical signals 113 and 114 are out of phase by 90° as shown in FIGS. 12a and 12b, the rotor 27 and the beam guide 73 are synchronized; that is, they have the same rotational speed and are in phase in rotation. Thus, the phase locking may be attained. The phase locking system described above is only one example, and any other suitable phase locking systems may be of course used in the present invention.

Evaporation of metal from a heavy location of a portion of the rotor, which may be continuously carried out, may be controlled by the suitable selection of the flow rate and pressure of the oxygen jet, the intensity of the continuous laser beam and evaporation time in response to the control signal 29 from the detector 23. The oxygen jet may intermittently and locally impinged against the rotor 27 as with the case of the device of the type employing the pulse laser beam, thereby controlling the evaporation. With the quasi-pulsed laser beam, the evaporation may be controlled by the number of pulses each having a sufficiently long duration.

As described previously elsewhere, an oxidizer may be in solid, liquid or gas phase, but an oxidizer in gas phase such as oxygen gas is most effective in practice. Therefore method for introducing an oxidizer into contact with the rotor 27 will be described in conjunction with the oxygen gas. The oxygen gas introduction methods may be, in general, divided into two types as will be described below.

Figure 14:
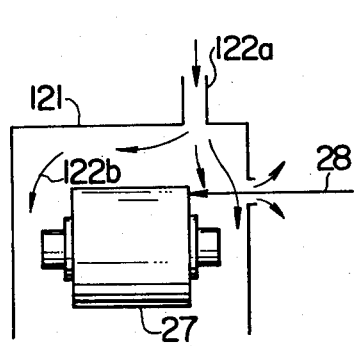
FIGS. 14, 15 and 16 are views of arrangements, respectively, for introducing and oxidizer.
Figure 15:
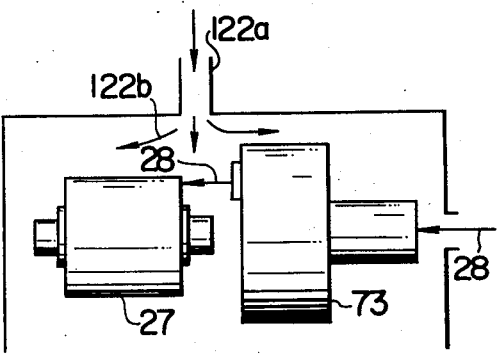

In one type, the rotor 27 is placed within the oxygen gas atmosphere as shown in FIG. 14. The oxygen gas is admitted through a port 122a into an oxygen gas cover or chamber 121 and flows as indicated by arrows 122b. In case of the device of the type utilizing the continuous laser beam, the cover 121 is so arranged as to enclose both the rotor and the beam guide 73 as shown in FIG. 15.

The other type is such that the oxygen gas is injected to be concentrated at a location of a heavy portion on the rotor where the laser beam is focused. In an arrangement shown in FIG. 16, a nozzle 141 is so fixed that the oxygen jet may be continuously injected and impinged on a heavy portion or evaporation spot. Therefore this arrangement may be advantageously used in conjunction with the device of the type utilizing the pulsed laser beam.

In FIG. 17, there is shown an arrangement adapted for use with the other device of the type utilizing the continuous laser beam. An oxygen admission cylinder 151 with the port 122a is disposed coaxially and outwardly of the hollow shaft 73a of the beam guide 73. The oxygen gas is admitted through the port 122a into the oxygen admission chamber 151, from where the admitted oxygen gas flows through a port 152 formed through the hollow shaft 73a, and further flows through the beam guide 73 and is injected through a nozzle 73c together with the continuous laser beam 28.

So far the laser beam, pulsed or continuous, has been described as the thermal energy source for removing heavy portion in the rotors, but it will be understood that any other suitable thermal energy sources such as electron beam, arc discharge in the air and so on may be equally utilized in the present invention.

As described above, the laser beam is utilized for evaporating and removing excess metal at a heavy portion in a rotor in order to balance it. In general, however, the latent heat of evaporation is greater than the latent heat of heating and melting by a factor of 10 so that in order to attain rapid and efficient evaporation of excess metal, the laser beam must be focused at a heavy portion with as extremely high energy concentration or density as practicable. During evaporation the incident energy is mainly converted into the latent heat of evaporation, but some loss cannot be avoided.

In general, the higher the energy density of the incident laser beam, the lesser the loss become. Therefore, the laser beam must be focused at a very fine spot, but as is well known in the art when the laser beam is focused too finely on the rotor, a hole being cut tends to have a small diameter and a greater depth. From the standpoint of the construction of the rotor, this tendency is undesirable and furthermore the operating efficiency of the out-of-balance correction drops, since, in case a deep hole having a small diameter is formed, the oxidizer can be insufficiently fed onto a metal to be removed.

To overcome the above problems, according to the present invention, the laser beam is so focused that it is scanned over certain area corresponding to the location of a heavy portion on the rotor to prevent the formation of a hole with a small diameter and a greater depth, whereby evaporation and removal of excess metal may be accomplished in an appropriate area which is ideal from the standpoint of both the operating efficiency of the correction and the construction of rotors being corrected.

The present invention will become more apparent from the following description of the preferred embodiments thereof taken in conjunction with the accompanying drawings.

First of all, the explanation will be made concerning an example utilizing a continuous laser beam.

In FIG. 18, there is shown an optical path with a beam guide having reflecting mirrors $B_1$ through $B_n$. The laser beam 28 is incident to each reflecting mirror B not at an angle of 45° but at any other suitable angle. For instance, the laser beam 28 is incident to the first reflecting mirror $B_1$ at an angle of δ and is reflected at the same angle δ. The laser beam 28 which is redirected by the reflecting mirrors $B_1$ through $B_n$ is focused by the condenser lens or system 31. The optical path is selected to be best suited for the construction of a rotor.

Assume that the laser beam 28 is admitted into the beam guide at an angle of θ to the axis 510 of rotation.

Then from the observation of FIG. 18 based on geometrical optics, it is readily seen that the spot of the focused laser beam 28a traces a cycloid as shown at 520. This is true regardless of the number and positions of the reflecting mirrors B. The focused spot of the laser beam 28a traces a cycloid 520 in space but describes a circle on the rotor spinning. The radius d of the circle is given by the following relation:

$$d = f\theta$$

where f = focal length of the condenser lens or system 31. The period of rotation is equal to that of the beam guide and hence the rotor 27, and when θ is constant, the focused spot is describing the circle at a speed $$v = wd$$

where w = angular velocity of the rotor. Therefore the speed v increases as the radius d increases as shown in FIG. 19a.

Next let us consider that θ is not constant and changes in time. Then the focused spot will not make a circle on the rotor, but rather a spiral as shown in FIG. 19b is formed. When the angle θ changes periodically, the focused spot reciprocates along the spiral. In practice, the diffraction of the laser beam cannot be avoided so that when a diffraction angle is a, the focused spot has a diameter af. Thus the spiral line has a width of 2af. Therefore when the angle θ periodically changes in time sufficiently slowly, the focused spot completely sweeps a circle shown in FIG. 19c, describing a spiral coil. The radius R of this circle is given by $$R = f\theta_{max}$$

Figure 20:
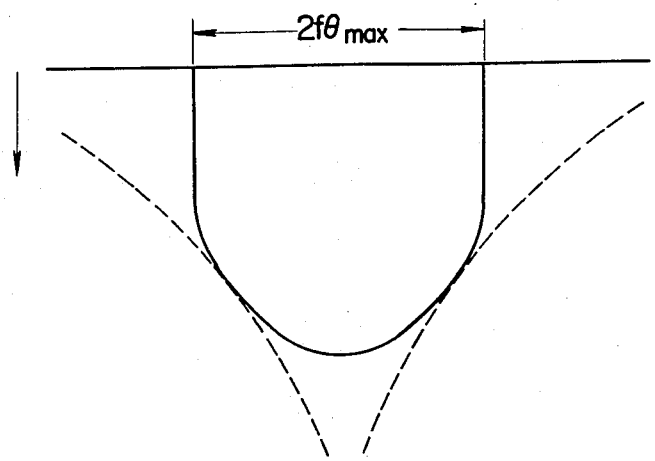
FIG. 20 is a view used for the explanation of a hole cut in a rotor with the energy beam scanning device shown in FIG. 18.

The angle θ may be changed in time in various ways, and in this embodiment it is assumed that it changes linearly for the sake of simplicity. As described above, the focused spot has a circumferential speed $v_\parallel$ given by $$v_\parallel = w \cdot d$$

and is proportional to d. The radial speed $v_\perp$ is given by $$v_\perp = \dot{d} = f \cdot \dot{\theta}$$

and is constant. Assume that the depth of cut be in proportion to the density of incident energy. Then it is in inverse proportion to d as indicated by the dotted lines in FIG. 20. However, there is a limit to the minimum diameter of focused spot due to diffraction so that a hole cut has a cross sectional configuration indicated by the solid line in FIG. 20. As described above, however, the angle θ may be changed in time in various manners, logarithmically or sinusoidally, so that the cutting conditions and especially the shape at the center of a hole may be controlled by suitably changing in time the angle θ.

Figure 21:
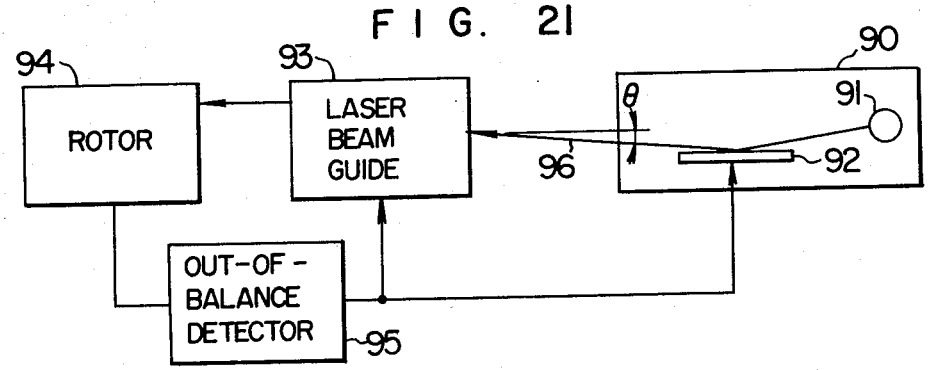
FIG. 21 is a block diagram of the energy beam scanning device shown in FIG. 18.
Figure 22:
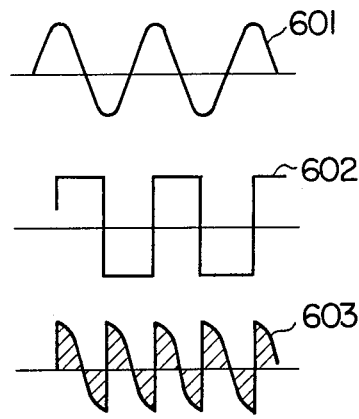
FIG. 22 shows waveforms of signal used for the explanation of the mode of operation of the device.

FIG. 21 shows an arrangement for changing the angle θ in time. A laser system 90 consists of a laser oscillator 91 and a reflecting mirror 92. The laser beam from the laser 91 is reflected and directed by the reflecting mirror 92 to be incident at a laser beam rotor 93. The angle θ between the laser beam and the axis of rotation of the beam rotor 93 is dependent upon the direction of the laser beam emitted from the laser 91 and the direction of the reflecting surface of the mirror 92. Assume that the laser beam is emitted at a predetermined direction. Then, the angle θ is only dependent upon the direction of the reflecting surface of the mirror 92. Therefore, when the reflecting surface of the mirror 92 is changed in direction in response to a signal from an out-of-balance detector 95, representing the eccentricity of the center of gravity of a rotor 94, the angle θ changes in time. The reflecting mirror 92 may be of course be driven by an independent driving device. Instead of driving the reflecting mirror 92, the laser oscillator 91 may be periodically reciprocated so as to change the direction of the laser beam in time.

In summary, in an automatic balancing device of the type wherein the out-of-balance condition of a spinning rotor is detected and is corrected or balanced by the evaporation and removal of excess metal at a heavy portion by the laser beam while the rotor is spinning, the angle θ between the axis of the laser beam and the axis of rotation of a laser beam rotor for revolving the laser beam in synchronism with a rotor to be corrected or balanced is changed in time so that the laser beam may scan over a given portion in the surface of the rotor. Therefore, the rotor may be formed with a hole at a suitable position so as to give the optimum for efficiency balancing the rotor and so as to provide the optimum structure of the rotor. There are, of course, other methods to scan the correcting position of the rotor.

Figure 23:
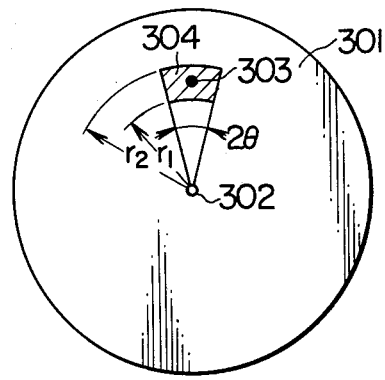
FIG. 23 is a view used for the explanation of scanning mode attained by the scanning device incorporated in the second embodiment.

FIG. 23 shows one end face 301 of the rotor 201 rotating about the axis 302. A spot 303 from which excess metal is evaporated and removed for balancing and will be referred to as "the correcting or balancing spot" in this specification, is determined depending upon the configuration, construction and eccentricity of the rotor 201.

In this embodiment, a two-dimensional, polar coordinate scanning method is employed for causing the laser beam or, more particularly, a focused spot of the laser beam to scan a hatched area 304 defined by an arc of a circle with a radius $r_2$ subtending an angle of $2\theta$, an arc of a circle with a radius of $r_1$ subtending the angle of $2\theta$, and two radial lines spaced apart by $2\theta$.

Figure 24A:
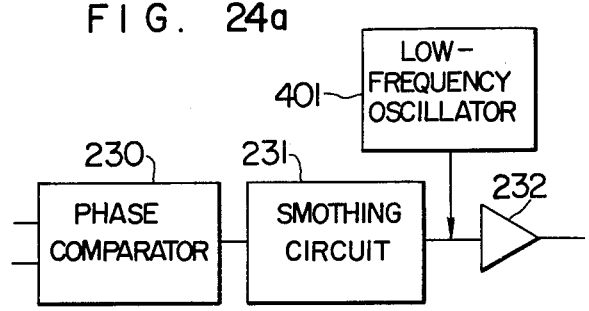
FIGS. 24A and 24B and FIG. 25 are views used for the explanation of the mode of operation of the energy beam scanning device incorporated in the second embodiment.
Figure 24B:
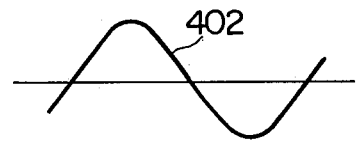
Figure 25:
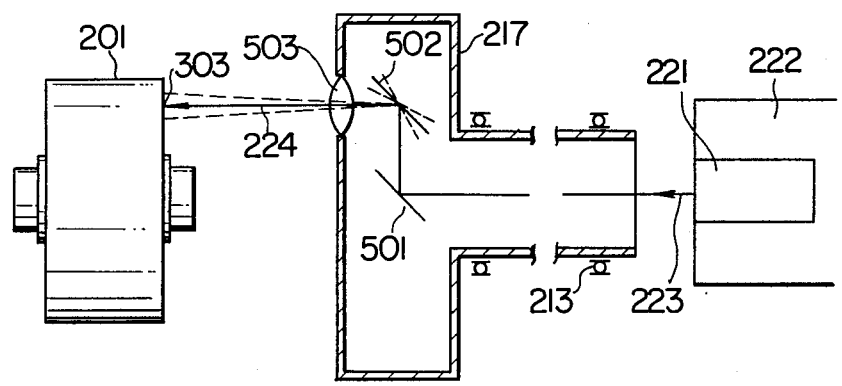

For scanning in the circumferential direction, an output from a low-frequency oscillator 401 is applied to the amplifier 232 as shown in FIG. 24a so that a sinusoidal waveform signal 402 (see FIG. 24b) may be applied to the phase correction motor 215, whereby the phase of the inner cylinder 217 relative to the spinning rotor 201 may be periodically changed. The amplitude of the sinusoidal signal 402 is dependent upon the angle θ. For scanning in the radial direction, a laser beam reflecting mirror is oscillated at a predetermined low frequency. More specially, as shown in FIG. 25, the laser beam 223 emitted from the laser oscillator 221 is transmitted along the axis of the inner cylinder 217, redirected by reflecting mirrors 501 and 502 and focused by a condenser lens 503 at the balancing spot 303 in the rotor 201. When the reflecting mirror 502 is oscillated as indicated by the broken lines, the focused spot of the laser beam is periodically displaced in the radial directions. In order that the focused spot may scan only the hatched spot 304 shown in FIG. 23, a maximum oscillation angle of the reflecting mirror 502 must be suitably selected. The amplitude is also dependent upon the relation between the scanning speed and the hole cutting speed. The reflecting mirror 502 may be periodically swung by a cam which in turn is driven by a motor.

In the laser beam scanning, it should be noted that a scanning speed is dependent upon a ratio of the period of the circumferential scanning to the period of the radial scanning. When the ratio is unity or an integer, the focused spot of the laser beam always scans the same paths so that it cannot scan a wide area. Therefore care must be taken to obtain the ratio which is not an integer.

Next the scanning speed will be explained. In general, the laser beam incident on a surface of a metal is reflected at a high reflectivity, but as soon as the surface is subjected to evaporation or when a hole is cut in the surface, the reflectivity suddenly drops so that hole cutting may be proceeded. When the laser beam is scanned at an excessively high speed, it is almost reflected with a resulting considerable decrease in energy efficiency. On the other hand, when the scanning speed is too slow, the machining conditions are substantially similar to those attained when the laser beam is held stationary so that the defects encountered in the prior art appear. Therefore, a scanning device must be provided which may freely change the scanning speed so that evaporation and removal of excess metal may be accomplished under optimum conditions depending upon configurations, constructions and materials of rotors or the like to be balanced. For this purpose, according to the present invention, an output frequency from the low-frequency oscillator 401 may be changed to thereby change the circumferential scanning speed whereas a voltage to be supplied to the motor for driving the cam for oscillating the reflecting mirror 502 is changed to thereby change the radial scanning speed.

The scanning system may be simpler when the refractive optical system is used in the beam rotating mechanism instead of using the reflective optical system, or when the differential gear unit is utilized for the phase alignment.

First, two examples will be explained for scanning in the circumferential or angular direction, using the reflective optical system and the differential gear unit.

The first example is applied to the differential gear unit shown in FIG. 13. The phase alignment motor 743 is used for this scanning. After the phase alignment has been made, the forward and reverse rotation of the motor 743 is repeated, as indicated by a double head arrow 760. The first spur gear 741 is, then, rotated in a forward and reverse direction within a given angle which directly corresponds to the scanning angle in the circumferential direction, if the rotating ratio between the rotor 701 and the first spur gear 741 is equal to 1. There is an advantage in this method, since both the circumferential scanning and the phase alignment can be made with a single motor mounted on a fixed base.

Figure 26:
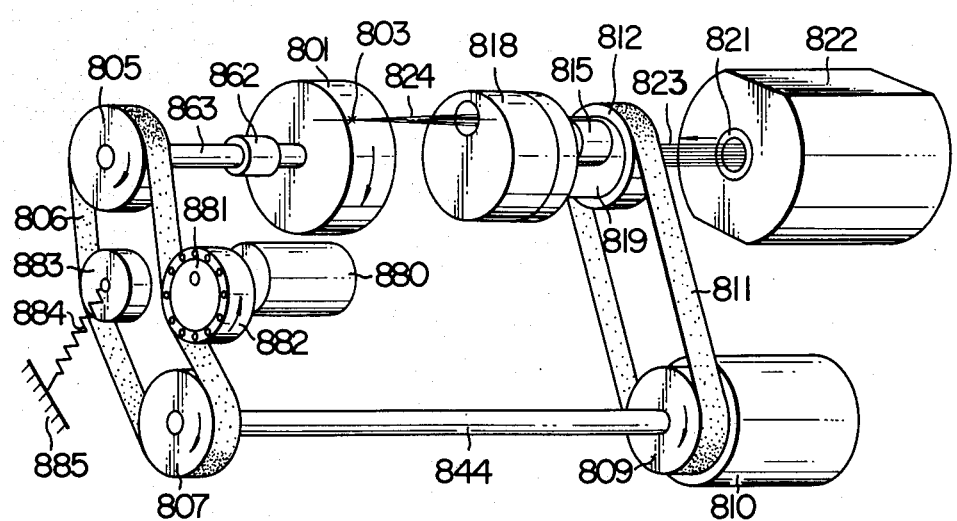
FIGS. 26 and 27 are views showing other examples of the energy beam scanning device.

The second example utilizes the tension control of a belt. As illustrated in FIG. 26, a laser beam 823 generated by a laser oscillator 822 is converged, by mean of the beam guide 818, into a rotating laser beam 824 which is focussed onto the surface of the rotor 801 at a position 803. The phase alignment is made by a phase alignment motor 815 which is mounted on the peripheral surface of a cylinder 812, and which rests when the phase alignment has been completed. A circumferential scanning motor 880 is then gently rotated in either direction so that a cam 881 which is eccentrical connected to the shaft of the circumferential scanning motor 880, deflects a belt 806, continuously and periodically. As the result, the tension of the belt is periodically changed so as to obtain a circumferential or angular scanning. Onto the peripheral surface of the cam 881 is inserted a cylindrical bearing 882 which is freely rotatable, following the belt movement. The belt 806 is applied with a predetermined tension by means of a spring 884 through a roller 883.

In a modified example of the belt tension control, if the belt 806 has a length so long as to be largely deflected, the phase alignment can be made by the motor 880 without the motor 815.

Figure 27:
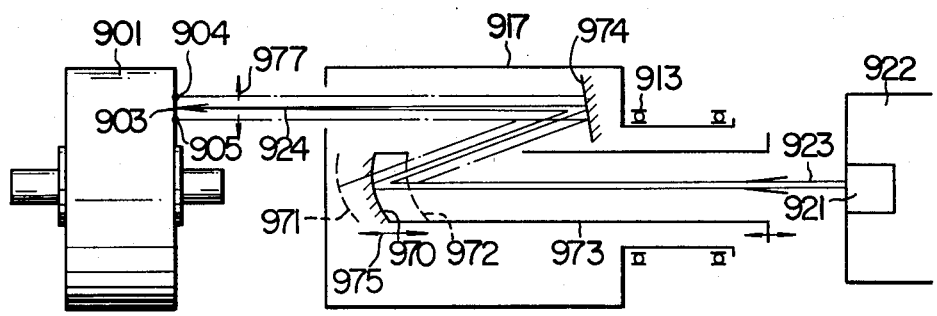

Next, an example will be explained for scanning the laser beam in the radial direction, referring to FIG. 27.

A laser beam 923 generated by a laser oscillator 921 is reflected by the first mirror 970 and directed to the second mirror 974. At least one of the first and second mirrors 970, 974 is concave so that the laser beam 924 reflected by the second mirror is converged to a focus 903 on the surface of a rotor 901. The first mirror 970 is carried by a mirror holder 973 with which the first mirror 970 can be moved between positions 971 and 972. The holder 973 is so mounted to a beam guide 917 by means of a cylinder (not shown) that the holder 973 as well as the first mirror 970 is rotatable with the beam guide 917. The cylinder (not shown) may have elongated holes through which the holder 973 is mounted with pins.

The movement of the first mirror 970 results in shifting the reflected laser beam 924 in parallel relation. Therefore, the focused spot scans on the surface of the rotor 901 in a given distance between positions 904 and 905. The position 903 which is the phase alignment position, becomes the midcenter of the distance between the positions 904 and 905.

Since the first mirror 970 is slidable along the rotating axis of the beam guide 917, and since the slidable distance of the first mirror 970 may be large in comparison with the scanning distance of the focused spot, a high scanning accuracy can be obtainable. Further, the first mirror 970 slides along the rotating axis of the beam guide, the drive of the first mirror 970 may be easy and the drive means (not shown) may be simple.

The scanning system as far as described above is applicable to the rotor balancing device using the continuous laser beam. In case of the device using pulse laser beam, it may have a different scanning system. However, the scanning system may be simpler, therefore, the detail explanation of the system is omitted. In a few words, for example, the mirror 41 in FIG. 4 or 51 in FIG. 5 may be swung, periodically, in one or two dimensional directions, or in addition to that, the timing of the generating of a pulse beam may be varied.

Figure 28:
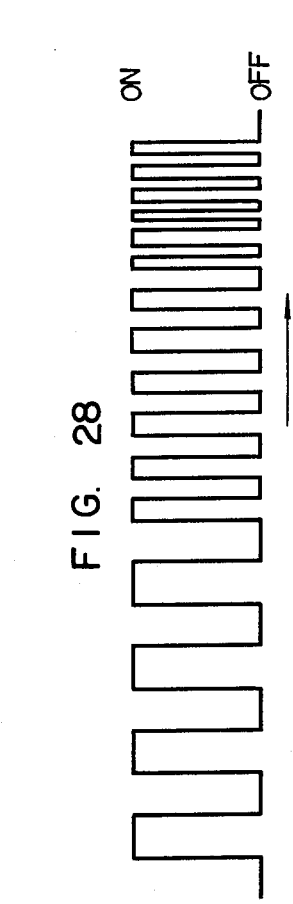
FIG. 28 is a diagram showing a correcting pattern of the energy beam.

As far as heretofore described, the exothermic reaction, due to the oxidation by the oxidizer and the laser beam, is utilized to remove the material of the rotor to be balanced. The oxidization acts on the material so rapidly as to remove a large amount of the material in a short time. In order to dynamically balance the rotor with a high degree of accuracy, an additional control means is necessary in addition to the feed back control system utilizing the oxidizer and the continuous laser beam. The additional control means is the one which discontinuously applies the laser beam or the oxidizer to the rotor to be balanced, that is, pulse emission of the laser beam or the oxidizer is used instead of the continuous application of them. The pulse emission may be made as shown in FIG. 28. The pulse width or the time of the emission period is controlled in proportion to the amount of the rotor unbalance, thereby, to balance the rotor with a high degree of accuracy. A control circuit for this purpose may be designed using well-known methods, therefore, the explanation of the control circuit is omitted.

According to the prior art rotor balancing techniques, the detection of an out-of-balance condition and its subsequent correction have been made independently of each other, but according to one aspect of the present invention to be described in detail hereinafter, the detection and correction are made simultaneously and automatically so that productivity may be considerably increased with the resultant economical advantages, saving in manpower may be achieved and extremely accurate dimensional control may be attained. Furthermore, a time required for correction may be considerably reduced. For instance, it takes only ten seconds to correct an out-of-balance condition of an armature of a small-sized motor, and this time is almost equal to the time required for mounting a workpiece or rotor on or removing it from an out-of-balance detecting and correcting device. During the time when a workpiece is mounted or removed, the laser beam is not emitted so that the rate of laser operation is about 50%. From the economical standpoint, this rate is extremely low and results in considerable economical losses because both the capital and operation costs of a laser oscillator are very expensive. In order to overcome this problem, a further embodiment of the present invention provides only one laser for a plurality of correction stations so that the rate of laser operation may be increased almost to 100%. The capital cost of a laser constitutes the major portion of the overall capital cost of a balancing device of the type utilizing the laser beam. On the other hand, the operation cost of the laser mainly consists of the cost of gas which is consumed independently of the ON-OFF operation of the laser at a short time interval. As a result, an attempt for increasing the rate of laser operation by controlling its ON-OFF operation would not contribute at all to the reduction in operation cost.

According to the present invention, two or a plurality of correction stations are provided for one laser, and each station is provided with functions of transferring a workpiece, mounting it on a predetermined position on the station, spining the mounted workpiece, detecting the out-of-balance condition of the workpiece, correcting the out-of-balance condition, stopping the spinning of the workpiece, removing the workpiece from the station and transferring it to the next station. The laser beam is continuously generated and redirected through various optical elements such as mirrors, reflectors and lenses to each correction station in a time sharing manner while the steps for mounting a workpiece, detecting the out-of-balance condition, correcting, removing and transferring the workpiece to the next station are carried out according to a predetermined time-sequence in each station.

Figure 29:
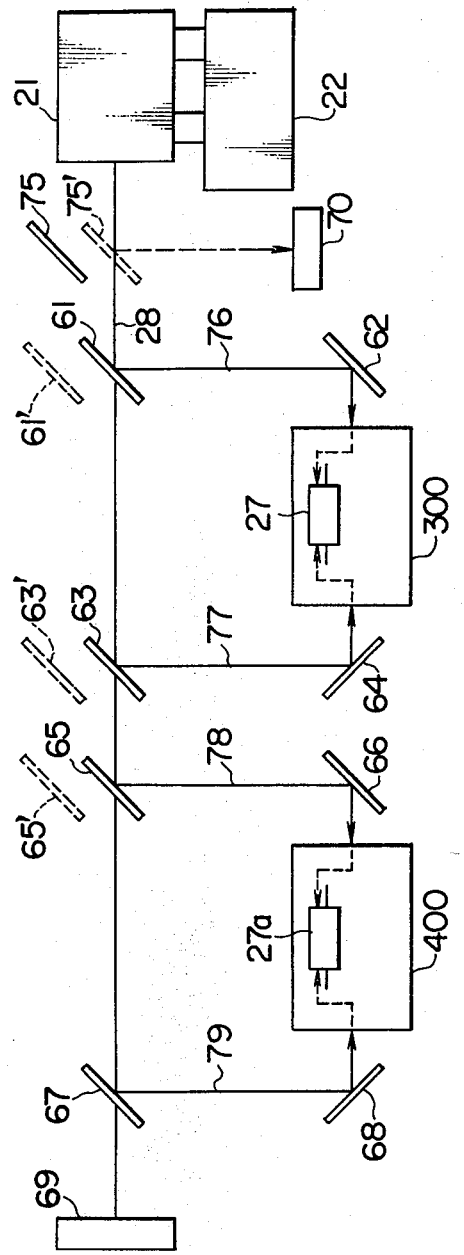
FIG. 29 is a view showing the third embodiment of the present invention.

FIG. 29 shows the second embodiment of the present invention. The laser 21 which is electrically connected to the power supply 22, generates continuously the laser beam which is transmitted to two out-of-balance detecting and correcting devices or stations 300 and 400 through the laser beam transmission paths defined by reflectors 61 through 68 and a beam stopper 69. Each of the devices 300 and 400 is substantially similar in construction to the device shown in FIG. 2 except that the laser 21 and the power supply 22 are eliminated.

The laser beam 28 is transmitted through the first path 76 including the reflecting mirrors 61 and 62 to the first device 300 and is focused on the location of a heavy portion on one end surface of the rotor 27 which is spun in the manner described above in conjunction with FIGS. 2 through 15, whereby the out-of-balance condition of the rotor 27 is detected and corrected.

In the second step, the reflecting mirror 61 is retracted out of the laser beam path to a position 61' so that the laser beam 28 passes along the second beam path 78 including the reflecting mirrors 63 and 64 and is focused on a heavy portion on the other end face of the rotor 27 at the first device 300.

In the first and second steps, the rotor 27a which has been balanced or corrected at the second device 400 is removed and a next rotor 27a is mounted, spinned and therefore is ready for the out-of-balance detection and correction. Previously described are the mechanisms for mounting or removing a rotor 27 and spinning it so that no description thereof is needed in this specification.

Upon completion of the second step, the reflecting mirror 63 is retracted out of the path of the laser beam 28 to a position 63' so that the laser beam 28 now passes through the third path 78 including the reflecting mirrors 65 and 66 and is focused at the location of a heavy portion on one end face of the rotor 27a mounted and spun on the second device or station 400, whereby the out-of-balance condition is detected and corrected. Concurrently, at the first device or station 300, the corrected or balanced rotor 27 is removed and another rotor is mounted and spun.

In the fourth step, the reflecting mirror 65 is retracted to a position 65' so that the laser beam 28 is passed through the fourth path 79 including the reflecting mirrors 67 and 68 and is focused at the location of a heavy portion on the other face of the rotor 27a on the second device 400, whereby the out-of-balance condition is detected and corrected. Meanwhile at the first station 300, the next rotor 27 to be balanced is mounted and spun to a predetermined speed.

Upon completion of the fourth step, the reflecting mirrors 61, 63 and 65 are returned to their initial positions, respectively, so that the laser beam 28 is directed to the first station 300. Thereafter the operation steps are cycled.

The mode of operation described above is based upon the assumption that the corrected or balanced rotor is removed and a next rotor to be balanced is mounted on one station 300 or 400 before the out-of-balance condition of the rotor has been detected and corrected on the other statin 400 or 300. However, when the detection and correction has been accomplished prior to the removal and mounting, all of the reflecting mirrors 61, 63, 65 and 67 are retracted away from the straight path so that the laser beam 28 impinges on the stopper 69. Alternatively, a reflecting mirror 75 which is normally held in the position indicated by the solid lines, is inserted into the straight path to redirect the laser beam 28 to a beam stopper 70.

Figure 16:
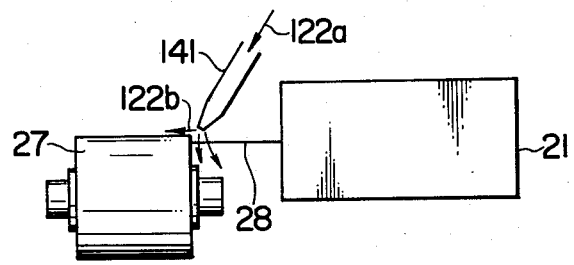
Figure 30:
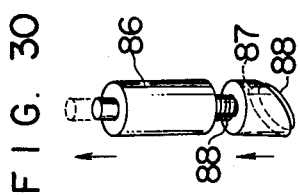
FIG. 30 is a detail view showing a reflector device used in the third embodiment of the present invention.

FIG. 30 is shows a mechanism for retracting the reflecting mirror to the retracted or inoperative position indicated by the dotted lines in FIG. 16. It consists of a solenoid 86 and a plunger whose lower end is terminated into a mirror holder 87 with a reflecting mirror 89 which is normally downwardly biased with a spring 88. When the solenoid 86 is energized, the plunger and hence the mirror holder 87 is caused to move upwardly against the bias spring 88 and consequently the mirror 89 is retracted out of the laser beam path. When the solenoid 86 is de-energized, the mirror holder 87 is moved downward under the force of the bias spring 88 into the operative or reflecting position indicated by the solid lines in FIG. 16.

So far the out-of-balance detection and correction are made in the fist step on one end face of the rotor 27 mounted on the first device 300, in the second step on the other face of the rotor 27. In the third step on one end face of the rotor 27a on the second device 400, and in the fourth step on the other end face of the rotor 27a, but it will be understood that the detection and correction sequence may be suitably varied as needs demand. When the rotor must be balanced to an extremely higher degree of accuracy, the detection and correction may be repeated on both the end faces of the rotor in an alternate sequence and as many times as required. In case of a disk-shaped, thin rotor, the detection and correction may be made only on one surface. Any desired combinations of the detection and correction steps may be attained by suitably programming a sequence for raising or retracing, and returning the reflecting mirrors.

Instead of the reflecting mirrors, light refraction elements such as prisms may be used.

In summary, the present invention provides a device for detecting and correcting or balancing the out-of-balance condition of rotors wherein a plurality of reflecting and/or refraction elements are arranged and displaced for transmitting the laser beam emitted from one laser oscillator to a plurality of out-of-balance detecting and correcting or balancing stations in a time sharing manner according to a predetermined sequence so that the following advantages may be attained.

(1) Since the continuous laser beam from one laser oscillator is transmitted to a plurality of detecting and correcting or balancing stations in a time-sharing manner and according to a predetermined sequence, pitch time may be reduced and consequently productivity may be remarkably improved;

(2) The rate of laser operation may be significantly improved so that productivity relative to the capital and operation costs may be increased and consequently many economical advantages results; and (3) The positions of the reflecting and/or refracting elements are controlled so that the laser beam, which is continuously generated, may be focused at a predetermined point or location of a heavy portion of a workpiece for a predetermined time. Therefore the control system is very simple in construction yet highly reliable and dependable in operation.

The above discussed time sharing operation is applicable, as a matter of course, to both devices utilizing a pulse laser beam and a continuous laser beam, respectively.

So far the laser beam has been used for evaporating and removing excess metal for balancing a rotor, but an arc discharge technique may also be used. More particularly, a discharge electrode is so arranged as to revolve in synchronism and in predetermined phase relationship with a rotor to be balanced so that an arc discharge may be established between the discharge electrode and the location of a heavy portion or balancing spot. The arc discharge may be established in the surrounding atmosphere or in an inert gas atmosphere. Excess metal may be evaporated and removed by the heat generated by the arc discharge established between the location of the heavy portion or balancing spot and the discharge electrode. It is preferable to use a tungsten discharge electrode because it is less susceptible to damages caused by the arc discharge in atmospheric air. The introduction of an oxidizer in a gas phase such as oxygen gas or in liquid phase of course results in an increase in efficiency of metal evaporation and removal. In this case, the heat generated by the arc discharge is used as a trigger for causing an oxidation reaction. The oxidation is an exothermic reaction so that the oxidation once started positively proceeds in a positive-feedback manner. As a result, excess metal may be evaporated and removed in a far greaer amount than by the arc discharge only. In this case, a tungsten discharge electrode is also preferable.

Instead of evaporating and removing excess metal, a rotor may be balanced by the addition or deposition of metal or any other suitable balancing material. More specifically, following the prior art arc discharge welding procedures, an electrode is melted to deposit molten metal on the rotor.

In all of the above balancing methods utilizing the arc discharge, it is rather difficult to establish an arc in a stable manner. Therefore, a high-frequency voltage is impressed across the discharge electrode and the rotor, whereby a stable arc discharge may be triggered and established. As with the arc welding, either AC or DC may be used.

A balancing device incorporating an arc discharge system which is not revolved, is substantially similar in construction and mode of operation to the balancing devices with a laser system described above in conjunction with FIGS. 7 through 11 so that no further description shall be made in this specification.

Figure 31:
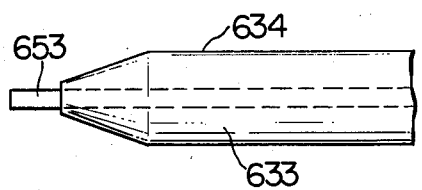
Figure 32:
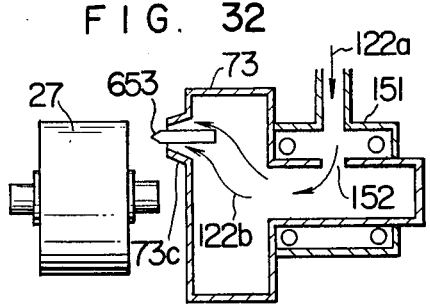

In FIG. 32, there is shown an embodiment of the present invention utilizing the arc discharge. A discharge electrode 653 is attached to an electrode rotor 73 which is substantially similar in construction to the beam guide 73 shown in FIG. 7. An arc is established between the electrode 653 and the rotor 27 to be balanced. A suitable oxidizer or inert gas may be admitted through an inlet port 122a into the electrode rotor 73 and discharged toward the rotor 27 through a space defined between the rotor 73 and the discharge electrode 653 as best shown in FIG. 31. That is, the oxidizer or inert gas is discharged through a space 633 between the discharge electrode 653 and a gas discharge nozzle 634.

Figure 33:
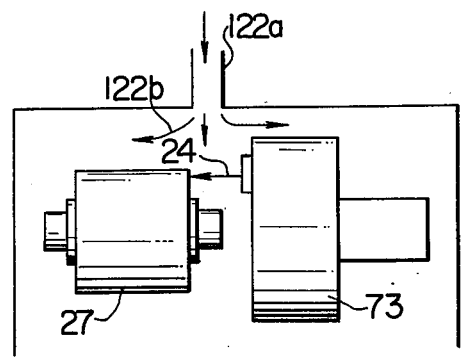

The arc discharge may be established in an atmosphere of suitable gas as shown in FIG. 33. Gas is admitted through the inlet port 122a into a cover or enclosure housing the balancing device and flows in the directions indicated by the arrows 122b.

As described previously, the balancing may be attained by the deposition of metal with a conventional welding electrode so that an arrangement for providing a shielding atmosphere is not required.

In addition to the laser beam and the arc discharge, an electron beam may also be used in a rotor balancing device in accordance with the present invention. The electron beam has the advantages in that it may be freely converged or focused, and deflected and the energy density may be increased considerably by the convergence and acceleration so that the electron beam has been widely used in welding and machining. In order to attain high efficiency of rotor balancing with the use of the electron beam, the inventor introduced various novel and improved arrangements. As with the case of the laser beam, the electron beam may be pulsated so that even though high energy is liberated, loss due to thermal conduction may be minimized and consequently adverse thermal effects on spots other than a desired spot may be eliminated. With the pulsed electron beam, an amount of energy available is limited so that the continuous electron beam may be used to evaporate and remove an increased amount of excess metal.

As to the focusing of the electron beam, the latter may be focused at a fixed spot in space or may be revolved by a mechanical or electrical system coaxially of a rotor to be balanced and in synchronism therewith in such a way that the electron beam may be always focused correctly at a desired spot on the rotor.

The electron beam may be used for evaporating and removing excess metal from a rotor to be balanced. The electron beam may be focused in the surrounding air or inert gas atmosphere, but it is by far more advantageous to focus the electron beam in vacuum as will be described in detail hereinafter with reference to FIG. 34.

Figure 34:
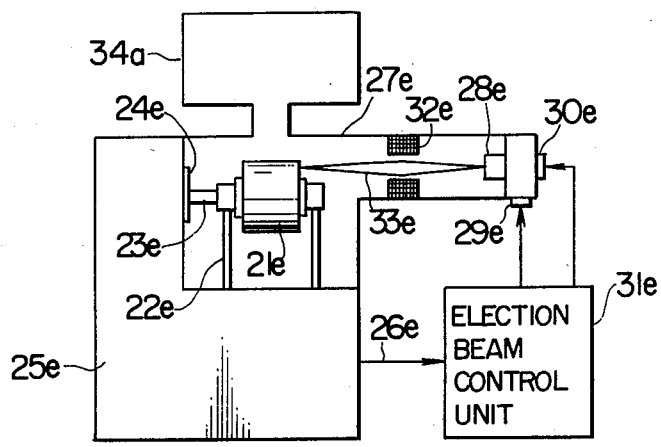

In FIG. 34 there is shown a rotor balancing device of the type utilizing the electron beam which is pulsated and focused in vacuum to evaporate and removeexcess metal of a rotor to be balanced. Pulsing the electron beam is a very effective means for minimizing thermal conduction loss to thereby increase the metal evaporation and removal efficiency.

A rotor 21e to be balanced is mounted for spinning on a support 22e including sensors or detectors for detecting the eccentricity of the center of gravity of the rotor 21e. An out-of-balance detecting device 25e includes a flexible coupling 23e for drivingly interconnecting the rotor 21e and a driving means 24e. An output 26e from the detecting device 25e is transmitted to an electron beam control unit 31e, and an electron beam 33e emitted from an electron gun 28e is converged or focused by a electromagnetic electron beam focusing lens 32e to bombard a desired spot in the rotor 21e. The pulsation of the electron beam 33e is controlled by a pulse timing control unit 29e and the acceleration is controlled by an electron-beam-acceleration-voltage control unit 30e. The rotor 21e and the electron beam 33e are enclosed within a vacuum chamber 27e which is evacuated by an evacuating device 34e to a desired degree of vacuum.

The most important feature of the balancing device with the above construction is not the pulsation of the electron beam but the focusing of the electron beam at a fixed point in space. The electron beam is pulsated so that it may be focused at a desired spot in the rotor 21e which is spinning at a high speed. When the rotor to be balanced is a rotor of a universal motor, it must be spun at 2000 rpm so that the allowable pulse duration is about 500 microseconds.

With the pulsed electron beam, highly efficient metal evaporation and removal may be assured, but a pulse duration is adversely limited. If the electron beam may be revolved coaxially of the spinning rotor 21e in such a way that it may be continuously kept focused at a desired or heavy portion in the rotor 21e, the pulse duration limit problem may be overcome so that the overall amount of the electron beam energy available may be by far increased.

Figure 35:
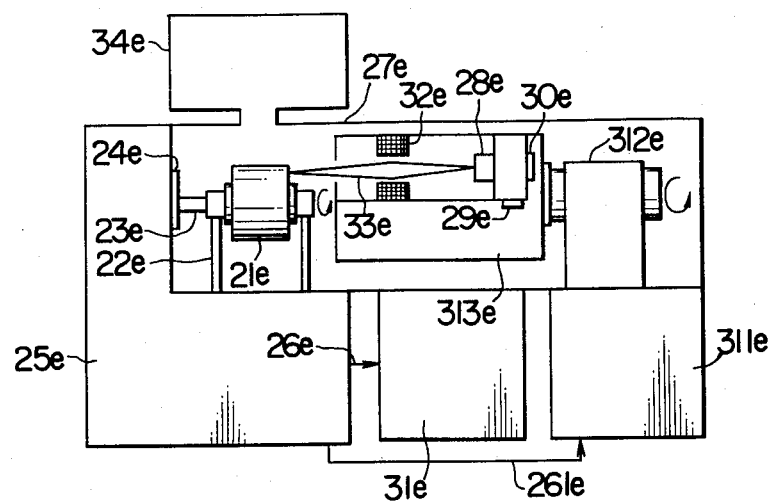

In FIG. 35, there is shown an embodiment of the present invention of the type utilizing the continuous electron beam in the manner described above. This embodiment is substantially similar in construction to the balancing device shown in FIG. 34 except that an electron beam generator 313e is rotatably supported by a bearing 312e and is rotated by a drive unit 311e in synchronism with the rotor 21e in response to a signal 261e from the detecting device 25e so that the electron beam 33e may be always precisely focused at a desired spot on the rotor 21e which is spinning at a high speed. Therefore the electron beam may be continuous or maybe pulsated to have a suitable pulse duration depending upon operating conditions.

The most important feature of this embodiment is that in response to an angular information in the output signal from the detecting device 25e, the rotation of the electron beam generator 313e is controlled.

Instead of the mechanical system for revolving the electron beam, an electromagnetic system may be used for deflecting the electron beam as will be described in detail with reference to FIG. 36.

Figure 36:
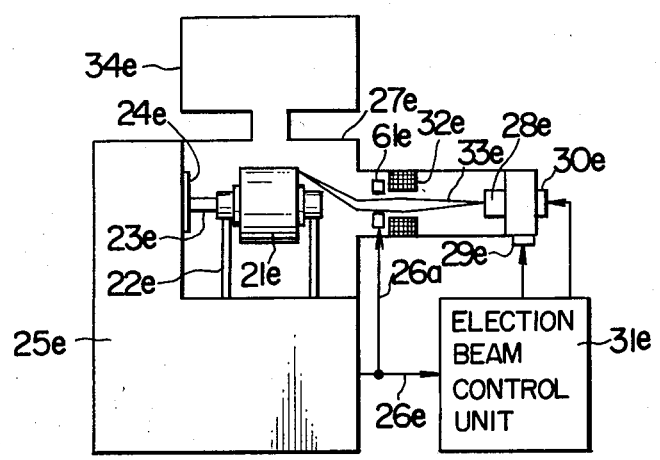

In FIG. 36, there is shown a further embodiment of the present invention which is substantially similar in construction to the embodiment shown in FIG. 34 except that a deflection coil 61e is incorporated in addition to the electromagnetic focusing lens 32e. The deflection coil 61e deflects the electron beam such that the latter may describe a circle. As with the case of the mechanical system described above, in response to an angular information 26a transmitted from the detecting device 25e, the circular deflection of the focused spot of the electron beam is locked in phase with the rotation of the rotor 21e.

The electron beam generator including the electron gun, the electromagnetic lens and the deflection coil are disposed within a vacuum, but the electron beam may be focused in the surrounding air so that the rotor 21e may be located exterior of the vacuum chamber. This arrangement is advantageous in that the operation efficiency may be improved, but a problem arises in that the metal evaporation and removal efficiency is decreased because of the pressure difference between the surrounding atmosphere and the vacuum in the vacuum container.

In an embodiment shown in FIG. 37, the electron beam generator 313e is located within the vacuum chamber which is evacuated to a desired degree of vacuum. Except for the electron beam generator 313e, other devices and units are all located in the atmosphere. The most important feature of this embodiment lies in an beam window through which the electron beam is emitted. The window consists of a reinforcing member 71e in the form of a grid or of any other suitable form and a thin film 72e made of a metal. The electron beam is transmitted through the fine film 72e to the surrounding atmosphere and focused at a desired spot on the rotor 21e.

Instead of utilizing the thermal energy liberated by the bombardment of the electron beam for evaporating and removing excess metal, the thermal energy may be used for triggering an explosion-like oxidation reaction described previously. For this purpose, at least the balancing spot of the rotor 21e must be made of a material such as metal which may be oxidized. As described previously, the oxidation reaction is an exothermic reaction so that the oxidation reaction is a sort of positive-feedback reaction and proceeds in an explosion-like manner as long as an oxidizer exists. An amount of thermal energy obtained by the oxidation reaction is by far greater than the thermal energy available from the electron bombardment alone so that the balancing or correcting efficiency may be remarkably improved. In practice, it is advantageous to use the oxygen gas, but any other suitable oxidizer in gas, liquid or solid phase may be used as needs demand.

FIG. 38 shows an arrangement for discharging the oxygen jet together with the electron beam to the rotor 21e in a rotor balancing device of the type wherein the electron beam revolves in synchronism with the rotor about the axis of rotation thereof. An oxygen admission chamber 111e is disposed coaxially outwardly of the shaft of the electron beam generator 313e, and the oxygen gas is admitted therein through an inlet port 122a and then flows into the electron beam generator 313e through an inlet port as indicated by the arrows 122b and is discharged through a nozzle 112e.

What we claim is:

1. A system for dynamically balancing a rotor, comprising:
   means for rotating the rotor;
   means for detecting the dynamic unbalance of the rotor rotated by said rotating means, said detecting means determining the magnitude of the dynamic unbalance and an unbalance correcting position of the rotor;
   an energy source generating a continuous laser beam capable of removing material from the rotor;
   means for supplying an oxidizer at least to said correcting position of the rotor;
   means for rotating the laser beam around the rotating axis of the rotor, said beam rotating means comprising a rotating cylinder synchronized in rotation with said rotor and a plurality of reflecting mirrors incorporated in said cylinder which constitute a reflective optical system for guiding the laser beam generated by said energy source, the laser beam from said energy source being introduced along the axis of said cylinder through the rear end of said cylinder and reflected through said mirrors so that the laser beam is converted into a laser beam rotating around the axis of said cylinder;
   means for controlling the rotational speed and the rotating phase of the rotating laser beam so as to synchronize the rotating laser beam with the rotation of the rotor, thereby causing the laser beam projected onto the rotor surface to follow the unbalance correcting position on one end surface of the rotor; and
   means for oscillating at least one of said reflecting mirrors to cause a continuous radial scanning of the laser beam spot over a substantially fixed area of said rotating rotor which includes the unbalance correcting position as said laser beam follows the unbalance correction position of said rotor, to remove from said one end surface of the rotor material extending over said area, and means for circumferentially vibrating said cylinder relative to the rotating rotor to cause the laser beam spot to scan said one end surface of the rotor circumferentially as well as radially.

2. A system as set forth in claim 1, wherein said means for rotating the laser beam drives said cylinder through a differential gear unit and said control means includes a phase control motor to operate said differential gear unit under the control of said controlling means, said vibrating means being adapted to control said phase control motor.

3. A device as set forth in claim 1, wherein said means for rotating the laser beam drives said cylinder through belts and pulleys, said vibrating means being adapted to control the tension of one of said belts.

4. A device as set forth in claim 1, wherein said scanning means controls the laser beam spot on the one end surface of the rotor so as to obtain a ratio of the radial and circumferential scanning speeds having a value other than an integer.

* * * * *